United States Patent [19]
Levens

[11] Patent Number: 5,322,724
[45] Date of Patent: Jun. 21, 1994

[54] LAMINATE OF HEAT SEALABLE POLYOLEFIN AND CURED POLYOLEFIN SHEETING

[75] Inventor: Dennis L. Levens, Hudson, Wis.

[73] Assignee: Minnesota Mining and Manufacturing Company, St. Paul, Minn.

[21] Appl. No.: 810,208

[22] Filed: Dec. 19, 1991

Related U.S. Application Data

[63] Continuation-in-part of Ser. No. 641,163, Jan. 14, 1991, abandoned.

[51] Int. Cl.$^5$ ............................. B32B 3/06; C09J 5/02
[52] U.S. Cl. .................................... 428/57; 428/58; 428/141; 428/147; 428/213; 428/220; 428/286; 428/287; 428/332; 428/337; 428/339; 428/349; 428/354; 428/492; 428/493; 428/495; 428/521; 524/495; 524/496
[58] Field of Search ............ 428/57, 58, 141, 492, 428/493, 521, 495, 61, 264, 267, 268, 265, 260, 286, 287, 290, 147, 507, 516, 517, 519, 213, 220, 332, 337, 339, 343, 347, 349, 354; 52/408, 409; 524/495, 496

[56] References Cited

U.S. PATENT DOCUMENTS

| | | | |
|---|---|---|---|
| 2,450,083 | 9/1948 | Donaldson | 428/40 |
| 2,732,737 | 4/1945 | Phillips | 154/42 |
| 3,650,874 | 3/1972 | Job et al. | 161/217 |
| 3,904,470 | 9/1975 | Fukuki et al. | 156/306 |
| 4,410,575 | 10/1983 | Obayashi | 428/57 |
| 4,421,807 | 12/1983 | Clausing et al. | 428/41 |
| 4,480,012 | 10/1984 | Fieldhouse | 428/306 |
| 4,501,842 | 2/1985 | Chmiel et al. | 524/432 |
| 4,514,442 | 4/1985 | Crepeau | 427/140 |
| 4,537,825 | 8/1985 | Yardley | 428/327 |
| 4,563,379 | 1/1986 | Kruger | 428/61 |
| 4,581,092 | 4/1986 | Westley | 156/306 |
| 4,588,637 | 5/1986 | Chiu | 428/355 |
| 4,640,730 | 2/1987 | Streets et al. | 156/334 |
| 4,720,039 | 1/1988 | Nishiguchi | 428/57 |
| 4,732,635 | 3/1988 | Levens | 156/230 |
| 4,740,413 | 4/1988 | Wildner | 428/198 |
| 4,743,332 | 5/1988 | Black | 156/359 |
| 4,767,653 | 8/1988 | Renstrom | 428/40 |
| 4,767,658 | 8/1988 | Lorenz | 428/192 |
| 4,800,120 | 1/1989 | Jadamus | 428/286 |
| 4,913,772 | 4/1990 | Taylor et al. | 156/499 |
| 5,093,171 | 3/1992 | Sheahan | 428/61 |
| 5,093,206 | 3/1992 | Schoenbeck | 428/521 |
| 5,096,743 | 3/1992 | Schoenbeck | 427/189 |

FOREIGN PATENT DOCUMENTS 1382826 2/1975 United Kingdom.

OTHER PUBLICATIONS

Brochure, "Computer Controlled Radiant Heat Cap Welder", GR Systems Inc., Aug., 1989.

*Primary Examiner*—Ellis P. Robinson
*Assistant Examiner*—Nasser Ahmad
*Attorney, Agent, or Firm*—Gary L. Griswold; Walter N. Kirn; James V. Lilly

[57] ABSTRACT

A laminate formed by heat fusing a heat sealable polyolefin sheet to two cured polyolefin sheets to produce a water impermeable seal between the cured polyolefin sheets. The heat sealable polyolefin sheet is preferably bonded to a porous heat resistant backing on one surface and the other surface is heat fused to the cured polyolefin sheets. The cured polyolefin sheets may typically be in juxtaposed or overlapping arrangement. The porous backing may be in the form of a fibrous sheet. The heat sealable polyolefin sheet is preferably low density polyethylene and the cured polyolefin sheets are typically cured EPDM rubber.

26 Claims, 5 Drawing Sheets

LAMINATE OF HEAT SEALABLE POLYOLEFIN AND CURED POLYOLEFIN SHEETING

This is a continuation-in-part of application Ser. No. 07/641,163 filed Jan. 14, 1991 abandoned.

BACKGROUND OF THE INVENTION

The present invention relates generally to bonding cured polyolefins to uncured polyolefins. In particular, the present invention relates to forming a laminate by heat fusing a sheet of cured polyolefin and a heat sealable polyolefin to produce a substantially water impermeable seal.

Rubbery olefinic polymer sheet material has widespread use in industries where it is desirable to provide a moisture proof membrane. For example, such membranes are used to line water reservoirs, waste treatment tanks, sewage lagoons, irrigation canals and industrial waste pits. Another important application is in the installation of flat roofs for commercial and industrial buildings.

The most common material used as a roofing membrane is a cured polyolefin polymer referred to in the industry as EPDM rubber. EPDM rubbers are formulated from polymers of ethylene, propylene and diene monomers. EPDM is commonly compounded with various fillers, colorants, antioxidants, extenders, or cross linking agents. Other membrane materials are available and are formed from butyl rubber, polymers of ethylene and propylene monomers referred to as EP rubber, and combinations of the above. Such rubber membranes may be vulcanized by exposure to temperatures of about 160° C. for about two hours. Other membranes are also available which are formed from PVC plastic, for example.

EPDM rubber roofing membrane is available in sheets formed into 2 to 6 m widths and a variety of lengths. The sheets are typically extruded to a thickness of 1.50 mm and then vulcanized according to known means. The vulcanized sheets are stored and shipped in roll form.

For many applications where rubbery membranes are used, it is necessary to connect a number of sheets together to form a substantially continuous water impermeable membrane over the surface to be protected. Forming a substantially water impermeable seam between such membranes has proven difficult.

In the case of roofs, extremely rigorous demands are placed on the membrane, particularly in the areas where the sheets are spliced together. Roof temperatures may reach the boiling point of water when exposed to the summer sun, or may sink to −30° C. or below in the winter.

In most applications, the ability of the bond to protect the underlying surface is critical. For instance, with roof membranes, it is critical to form a substantially water impermeable joint which is capable of withstanding freeze and thaw cycles, and will remain intact for the entire life of the roof.

In order to protect the membrane from wind damage, the installed membrane is typically anchored to the substrate by mechanical means. One anchoring method includes covering the membrane with ballast consisting of rounded washed river rock. Another method includes providing battens anchors. Battens anchors often are positioned at intervals along a sheet, and require mechanical fasteners to pass through the membrane into the substrate. Piercing the membrane forms a path for moisture to reach the substrate. Sealing the openings created by the battens has also proven difficult and time consuming. Another anchoring method includes installing a flock backed membrane to a substrate covered with a tacky substance to anchor the flocking.

Apart from the difficulties in installing a roofing membrane, maintenance is also difficult. It is often necessary to patch areas of such continuous surfaces to stop moisture from leaking through the membrane.

Along with the problem of extreme weather conditions encountered on a roof, an additional problem has been present when using EPDM (ethylene, propylene, diene monomer) rubber for roofing applications. Although EPDM rubber is a very durable roofing material, its properties are similar to wax in that its surfaces are slick and have low surface energy. Consequently, EPDM rubber surfaces are resistant to many adhesives. Much time and effort has gone into developing adhesives which adhere properly to EPDM rubber and similar membrane materials.

Several methods are known for sealing two surfaces of cured polyolefin sheets together to form a seam between two adjacent sheets of roofing membrane. Two known seaming methods include the use of contact cement systems and the use of pressure sensitive adhesive tape systems. For example, Fieldhouse U.S. Pat. No. 4,480,012 discloses a pressure sensitive adhesive composition formulated for bonding cured EPDM sheets. The adhesive includes a neutralized sulfonated EPDM elastomeric terpolymer, an organic hydrocarbon solvent and/or an aliphatic alcohol, a para-alkylated phenol formaldehyde tackifying resin and alkylphenol or ethoxylated alkylphenol. The surfaces to be bonded are coated with mineral oil, are abraded, cleaned, coated with the described adhesive, allowed to dry, and are forced together by means of pressure.

The use of the adhesive described in the Fieldhouse U.S. Pat. No. 4,480,012 patent requires numerous preparation steps and requires the use of solvents and mineral oil to prepare and clean the surface prior to sealing. Installing such roofing joints is tedious, time consuming and costly.

The Fieldhouse U.S. Pat. No. 4,480,012 is merely one example of the numerous pressure sensitive adhesives developed to connect roofing membranes. Still other sealing systems utilize primers and paint-on contact adhesives. Each of the seaming methods described above have proven to be costly, time consuming and tedious. Many of the earlier developed pressure sensitive adhesive systems also require the use of a variety of solvents which are believed to cause environmental and health problems.

Methods of connecting membranes other than by using pressure sensitive adhesives have also been developed. For example, thermoplastics have been used as adhesives for connecting membranes. Thermoplastic adhesives do not require the use of solvent-based primers (except to clean the surfaces to be joined, if necessary) and therefore do not generate hazardous wastes as a result of installing a membrane system. Thermoplastic adhesives are also less expensive to manufacture than contact adhesives and pressure sensitive adhesives. In practice, the process of developing thermoplastic adhesives suitable for installing in the field has been difficult.

The Renstrom U.S. Pat. No. 4,767,653 and the Levens U.S. Pat. No. 4,732,635 for example describe the use of a strip of linear low density polyethylene mounted onto a release liner for applying to the margin of a sheet of EPDM roofing membrane. The polyethylene is applied by placing the strip on a cleaned surface of cured or uncured EPDM rubber, the release strip facing away from the EPDM surface. Sufficient heat and pressure are applied to melt the polyethylene and form a bond between the polyethylene and the membrane.

The most preferred method of applying the polyethylene strip in the Renstrom U.S. Pat. No. 4,767,653 and the Levens U.S. Pat. No. 4,732,635 patents is in the factory prior to vulcanizing. The method includes contacting a polyethylene surface of the release backed adhesive strip and a surface of an uncured sheet of EPDM, and subjecting the sheet to 375 kPa pressure at 150° C. for several hours to vulcanize the membrane and at the same time form a bond between the polyethylene and the membrane.

To connect two membranes having factory installed polyethylene strips located along the edges of the membranes, a first membrane sheet is positioned on the surface to be protected such that the polyethylene strip faces up. A second membrane is positioned adjacent to the first membrane such that the polyethylene strip faces down and is adjacent to the upward facing polyethylene strip. The membranes are positioned such that the polyethylene strips substantially overlap. The protective release liners are removed prior to bonding. Heat is applied either to the polyethylene surfaces or to the upper surface of the second membrane at a temperature and for a time sufficient to soften the adhesive strips. The strips are then pressed together, forming a seal.

The polyethylene strips disclosed in the Levens '635 and Renstrom '653 patents are most advantageously applied in the factory under controlled conditions. Unfortunately, unless the membrane is completely bonded to the sheet of polypropylene, the precise dimensions and placement of each sheet of membrane must be determined in advance of bonding the polypropylene strips in order for the seams to be formed where necessary on the job site.

Measurement errors, errors in the placement of particular membrane sheets, and deviations in dimensions between blueprints and actual structures to be protected lead the membrane installer to prefer adhesives that can be conveniently and rapidly applied in the field. Although a membrane could be uniformly coated on one entire surface with the adhesive film according to Renstrom U.S. Pat. No. 4,767,653 and the Levens U.S. Pat. No. 4,732,635, the cost would be prohibitive.

SUMMARY OF THE INVENTION

The present invention is directed to a laminate formed by heat fusing a heat sealable polyolefin sheet to two cured polyolefin sheets to produce a water impermeable seal between the cured polyolefin sheets. The cured polyolefin sheets are typically roofing membranes composed of rubber, preferably formed of ethylene, propylene and diene monomers (EPDM) or ethylene and propylene monomers (EPM). The heat sealable polyolefin sheet is preferably selected from low density polyethylene, linear low density polyethylene, ethylene vinyl acetate, propylene and a blend of low density polyethylene and propylene. However, linear low density polyethylene is most preferred.

Preferably the heat sealable polyolefin is bonded to a porous backing on one surface and the other surface of the heat sealable polyolefin is fused to the cured polyolefin sheets. The porous backing functions as a reinforcing layer and is preferably formed of heat resistant fibrous material which serves to provide integrity to the heat sealable polyolefin sheet, especially as the heat sealable polyolefin sheet is heat fused to the cured polyolefin sheets. The reinforcing layer is preferably composed of fiberglass, polyester, cellulose, cotton, or nylon fiber. The reinforcing layer has a melting point higher than the highest temperature to which the heat sealable polyolefin sheet is heated.

In one aspect of the invention the laminate is formed by heat fusing a heat sealable polyolefin sheet preferably of linear low density polyethylene, to two adjacent (juxtaposed) cured polyolefin sheets so that the heat sealable polyolefin sheet covers and seals the adjacent edges of the cured polyolefin sheets. In another aspect the laminate is formed by heat fusing a heat sealable polyolefin sheet preferably of linear low density polyethylene to two overlapping cured polyolefin sheets. In this case the heat sealable polyolefin sheet covers and seals the seam formed by the overlapping cured polyolefin sheets.

The heat fusing is accomplished preferably by applying heat to the contact area between the heat sealable polyolefin and the cured polyolefin sheet. Heat is applied to soften or activate the heat sealable polyolefin or the cured polyolefin sheet or both sufficiently to fuse the heat sealable polyolefin sheet to the cured polyolefin sheet. Pressure may be applied to the contacting sheets to facilitate their fusing to form a substantially water impermeable seal.

DETAILED DESCRIPTION OF THE PREFERRED EMBODIMENTS

Figure 1:
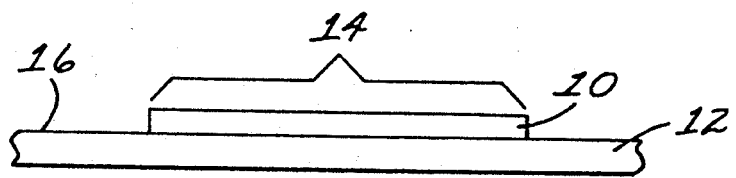
FIG. 1 is a schematic drawing illustrating a bond formed according to the present invention between a surface of a sheet of heat sealable polyolefin and a contact area of a sheet of cured polyolefin.

The present invention is directed to forming a laminate by heat fusing a heat sealable polyolefin sheet to cured polyolefin sheets to produce a water impermeable seal. In a preferred embodiment the heat sealable polyolefin is bonded to a heat resistant porous reinforcing layer on one surface and the other surface of the heat sealable polyolefin is heat fused to two juxtaposed or overlapping cured polyolefin sheets to produce a water impermeable seal.

The invention is effected by providing a cured polyolefin sheet having a surface, at least a portion of which has a contact area and providing a heat sealable polyolefin preferably having a softening point of at least about 80° C. and a melt index of at least 0.50 dl/g and heating a portion of the contact area to fuse the heat sealable polyolefin to the cured polyolefin. (The melt index is determined in accordance with ASTM D-1238.) The heat sealable polyolefin is provided in an amount effective to at least substantially wet the contact area of the cured polyolefin sheet. According to the present invention, either the contact area or a portion of heat sealable polyolefin effective to wet the contact area is heated to a temperature sufficient to activate the heat sealable polyolefin. The cured polyolefin contact area and the activated heat sealable polyolefin are contacted at a pressure and for a time sufficient to form a substantially water impermeable bond.

The following definitions are provided to aid in understanding the scope and content of the present invention.

A "joint" for purposes of this invention is a substantially water impermeable connection between at least two sheets a cured polyolefin, or one or more sheets of heat sealable polyolefin and one or more sheets of cured polyolefin, including but not limited to butt joints, lap joints, patches, welds and splices.

A "seal" for purposes of this disclosure is defined as an area in which at least two sheets of material are joined to form a substantially water impermeable bond. Examples of seals are capped butt seals formed between two sheets of cured polyolefin, lap joint, seals and patches applied to a damaged surface of the cured polyolefin.

"Contact area" for purposes of this disclosure is at least a portion of a surface of a sheet of cured polyolefin which is to be sealed. In roofing applications, the contact area is commonly an elongated strip extending along a length of a sheet of cured polyolefin, proximate an edge.

A "bond" for purposes of this disclosure is an interface between a surface of a heat sealable polyolefin layer and a contact area of a cured polyolefin which is substantially impervious to liquids.

"EPDM rubber" for purposes of this invention is a polymeric rubbery material formed primarily of blends of ethylene, propylene and diene monomers. The most preferred membranes for roofing applications also contain fillers such as carbon black, colorants, antioxidants, extenders, cross linking agents and other additives such as mineral oil. A typical rubber roof membrane is approximately ⅓ EPDM resin, ⅓ oil and ⅓ carbon black and other additives.

"Rubber tear bond" for purposes of this disclosure is a bond which is stronger than the tear strength of the rubber, the rubber delaminating and failing before the bond being tested. Rubber tear bonds typically have tear strengths varying from 1.8 to 9.0 Kg/cm.

The term "polyethylene" for purposes of this disclosure includes linear low density polyethylene products. The polyethylene may also include the normally employed stabilizers, fillers, extenders, processing aids, pigments, and the like.

The term "heat resistant" as applied to the porous reinforcing layer to which a heat sealable polyolefin is bonded, means that the reinforcing layer has a melting point higher than the highest temperature to which the heat sealable polyolefin bonded thereto is heated.

The present invention, although useful for any application where it is desirable to form a substantially water tight bond between at least one cured polyolefin sheet and a heat sealable polyolefin, is particularly useful in forming joints in sheets of roofing membranes.

The present invention utilizes at least one cured polyolefin sheet. The most preferred sheet material is EPDM rubber. Although EPDM sheeting is the most preferred membrane material for many roofing and lining applications, other materials such as EP membranes may also be used with the present invention with similar results. A representative rubber membrane is an EPDM rubber sheeting that is approximately 1.5 mm thick and is available from Carlisle Syntec Corp. of Carlisle, Pa. Although it is believed that the thickness of the membrane is not important to the present invention, a representative membrane thickness is about 1.5 mm.

The present invention also includes providing a heat sealable polyolefin having a melt index of at least 0.5 dl/g and having a softening point of at least 80° C. The most preferred heat sealable polyolefin has a melt index of at least 1.0 dl/g and a softening point of at least 110° C. A melt index of at least 1 dl/g enhances processability.

The most preferred heat sealable polyolefin film is a linear low density polyethylene (LLDPE) such as is available from the Union Carbide Company of Danbury, Conn., having a softening point (as defined in ASTM Test D-816, Procedure 19 (January, 1988)) of about 120° C. This polymer is available under the trade designation "G-Resin 7047 Natural". Other suitable adhesives can be selected which are thermoplastic blends of polyethylene and polypropylene such as "Tenite" 5321E available from Eastman Chemical Company of Kingsport, Tenn., homopolymers of olefin monomers and polymers of two or more olefin monomers, provided that the above softening point and melt index requirements are met.

It is also desirable that the selected heat sealable polyolefin have an activation temperature below a temperature which degrades the cured polyolefin sheet. The preferred EPDM rubber sheets degrade at temperatures of about 250° C. or above.

Many other polyolefins would form a suitable heat sealable polyolefin. For example, ethylene vinyl acetate such as "Elvax" 470 available from the E. I. du Pont deNemours Company of Wilmington, Del. and polypropylene such as polypropylene 580A available from the Shell Chemical Company of Houston, Tex. are suitable heat sealable polyolefins.

The heat sealable polyolefin is provided in at least an amount effective to substantially wet at least a portion of a surface of a cured polyolefin sheet defined as a contact area. FIG. 1 is a schematic drawing of a composite material having a cured polyolefin layer 12 and a heat sealable layer 10 formed according to the present invention. A portion of the surface 16 in contact with the layer 10 defines the contact area 14 of the surface 16 of the cured polyolefin layer 12. For smoother surfaces, less heat sealable polyolefin is necessary to form a suitable bond as compared to rougher surfaces.

Although it would be possible to provide the heat sealable polyolefin in a particle, pellet, powder or liquid form, the most preferred form of heat sealable polyolefin is in the form of a film. Films have the advantage of delivering a substantially uniform amount of heat sealable polyolefin to the contact area, and also are handled easily.

When a film is used to practice the present invention, the film may be extruded onto a release liner, extruded directly onto a contact area, or formed into a sheet by any known means.

Typically the heat sealable polyolefin is heated to a temperature at or above the softening temperature in order to activate it sufficiently to cause it to bond to the cured polyolefin.

The heat sealable polyolefin is also preferably selected such that the temperature which activates the heat sealable polyolefin is at least 50° C. below the temperature at which the cured polyolefin membrane degrades, to protect the membrane and to compensate for variations in process temperature.

According to a preferred embodiment, a LLDPE film having a thickness of about 0.13 mm is selected for bonding to a sheet of EPDM rubber roofing membrane. Films as thin as 0.05 mm would be adequate to form a suitable bond if the finish on the membrane is sufficiently smooth. The maximum film thickness is determined by economic considerations, and by the intended function of the film. For example, if the film were to serve also as a capping strip on a butt weld in addition to a seal, then the selected film thickness would be much greater. Processing times also increase with increasing film thickness.

Before the heating step, it is desirable to remove foreign substances from the contact area of the sheet of cured polyolefin. If the contact area is free of particulates and other matter such as water and oil, cleaning the surface prior to applying the adhesive is not necessary. Examples of particulates which can adversely affect the ability of the adhesive to bond include talc, mica and dust. The surfaces to be joined may be cleaned by conventional methods such as by applying solvent, e.g. heptane, to a cloth and wiping the surfaces.

According to the present invention, at least one of the following group including at least the contact area of the cured polyolefin sheet and at least an amount of the heat sealable polyolefin sufficient to wet the contact area is heated to a temperature sufficient to raise the temperature of the contact area of the cured polyolefin to at least about 160° C., and to activate the heat sealable adhesive. It is to be understood that this heating may be accomplished by heating all or a portion of the cured polyolefin sheet and not the heat sealable polyolefin or by heating all or a portion of heat sealable polyolefin and not the cured polyolefin sheet, or by heating all or a portion of cured polyolefin and all or a portion of the heat sealable polyolefin.

Enough heat is provided such that when the heated contact area and heat sealable polyolefin come into contact, the temperature of the contact area reaches at least about 160° C., and a temperature is reached sufficient to activate the heat sealable polyolefin.

As aforementioned, the heat curable polyolefin is preferably formed of EPDM rubber which does not degrade below 250° C. for the time during which bonding of the roof membrane takes place. It was surprisingly discovered that by attaining a temperature of at least 160° C. on the contact surface of the EPDM sheet, and preferably at least 177° C., and most preferably at least 205° C., when the contact area and the activated heat sealable polyolefin are brought into contact, the resulting bond formed between the heat sealable polyolefin and the EPDM sheet is sufficiently strong to withstand the extreme weather conditions encountered in many roofing applications. Although the mechanism is not precisely understood, it is believed that by raising the temperature of the contact area to at least 160° C. bonding is enhanced.

The upper limit of the selected membrane surface temperature is determined by the membrane material selected and the heat sealable polyolefin selected. It is necessary to select a surface temperature of the contact area which exceeds the melt point of the polyolefin adhesive. Preferably, the selected temperature is at least 10° C. greater than the melt point of the selected heat sealable polyolefin.

The manner in which the surfaces are heated is unimportant. According to the most preferred, method, a "Liberator Series 2000" cap welder available from G. R. Systems, Inc. of Columbus, Ohio can be used to deliver infrared heat to the surfaces to be joined, as well as to the adhesive. The seam welder utilizes a "V" shaped heater capable of delivering infrared radiation and raising the temperature of both of the surfaces to be joined at the same time to the selected temperature. An alternative method of heating is by means of hot air or by microwave energy.

According to the present invention, the contact area and the heat sealable polyolefin are contacted at a pressure and for an amount of time sufficient to form a substantially water impermeable bond. According to the most preferred method, a force of about 7 kPa or more is sufficient to achieve intimate contact. Pressures exceeding about 138 kPa do not form a better bond than pressures within the preferred range of about 7 to about 138 kPa. Not only is relatively little force required to affect the bond as compared to known methods, but the amount of time necessary to apply the pressure is relatively small. Preferably, only 2–3 seconds contact at a pressure of 7 kPa is necessary to form a suitable seal. According to a preferred method of forming roofing seals, a pressure roller is used for contacting the contact area and activated heat sealable polyolefin which delivers a sufficient force of about 7 kPa for about 2 seconds, forming a substantially water tight seal.

EXAMPLE 1

Two sheets of EPDM rubber, measuring 7.6 cm by 20.3 cm and having a thickness of 1.5 mm were provided. The rubber was obtained from Carlisle Syntec Corporation of Carlisle, Pa. A sheet of 0.13 mm thick LLDPE, available under the name "G-Resin 7047 Natural 7" having a melt index of 1 dl/g, was placed between the two sheets of EPDM rubber, forming a three layer sandwich. The entire three layer sandwich weighed approximately 70 grams. The entire sandwich was irradiated with approximately 700 watts of microwave energy for about 70 seconds. The structure was then contacted with a pressure roller to distribute the adhesive throughout the joint and form a substantially water impermeable seal. A satisfactory bond, namely a rubber tear bond was formed. (The rubber tear bond is a bond stronger than the tear strength of rubber.)

A portable microwave unit could potentially be a suitable device for heating the surfaces to be joined and the film. To further enhance the efficiency of such microwave heating, microwave susceptors could be incorporated into the adhesive to raise the adhesive temperature more rapidly.

EXAMPLE 2

Butt joints having a capping strip were formed according to the present invention, to form a rubber tear bond. Two sheets of 1.5 mm thick EPDM rubber membrane were positioned with adjacent edges pressed together forming a butt joint. A seam welder ("Liberator Series 2000") equipped with a roll of 0.13 mm thick LLDPE ("G-Resin 7047 Natural 7"), an infrared heat source and a pressure roller was positioned on the butt joint. A capping strip formed from an elongated sheet of 15 cm wide EPDM rubber was provided. The "Liberator" preheated a lower surface of the capping strip, the film and a contact area on both sides of the butt joint, by heating through the film according to the present invention. The welding machine was operated at 1.52 m/min and delivered about 1800 watts of power. Another preferred device is available by the same manufacturer which delivers 3150 watts. At higher power levels, the seam welder can be operated at even faster speeds.

According to the most preferred method, the cap welder connects the contact areas on either side of the butt weld to a lower surface of the film and the contact area on the capping strip to the upper surface of the film in one step. The activated heat sealable polyolefin and the contact areas were contacted by applying a downward force on the seam by means of a pressure roller. The pressure roller delivered only an amount of pressure necessary to achieve intimate contact or wetting of the molten adhesive and the surfaces to be joined. A preferred pressure of 7 kPa was used to form a substantially water impermeable bond. A satisfactory bond namely a rubber tear bond i.e., a bond stronger than the tear strength of rubber, was formed.

EXAMPLE 3

A LLDPE ("G-Resin 7047 Natural 7" with a melt index of 1 dl/g and a melt temperature of 120° C.) was extruded into a 0.13 mm thick film. A composite was made by placing the polyethylene film between two sheets of 1.5 mm thick EPDM rubber and by placing the stack on a hot plate with a probe between the bottom layer of rubber and the polyethylene film. The composite was heated until the probe reached a temperature of 163° C. The composite was then taken off of the hot plate and pressed with a 6.9 kg roller with two passes at a rate of about 18 m/min. After cooling, the sheets of rubber were pulled apart and rubber tearing bonds (i.e., bond having greater tear strength than rubber) resulted with no failure between the rubber and the polyethylene.

EXAMPLE 4

100 parts LLDPE ("G-Resin 7047 Natural 7" with a melt index of 1 dl/g); 0.2 parts ultraviolet absorber, CHIMASSORB 944 LD, commercially available from Ciba-Geigy; 7.0 parts carbon black/polyethylene blend pigment, DENA-0038BK, commercially available from Union Carbide Corp.; and 0.10 parts processing additive, DYNAMAR FX-9613, commercially available from 3M Company were dry mixed for about 15 minutes until uniformly blended. The blend was then extruded at 260° C. through a 0.64 mm slot die and passed through a set of rollers resulting in an extruded LLDPE sheet having a thickness of 1 mm. After the caliper was accurately set, a spunbonded polyester reinforcing layer, Reemay Style 2250, commercially available from Reemay, Inc., was laminated to one side of the hot extruded LLDPE sheet by passing the sheet and reinforcing layer between a water-chilled/cooled TEFLON coated rubber top roll and a steel bottom roll just as the LLDPE sheet exits from the extruder. This allowed the reinforcing layer to be pressed into the soft extruded LLDPE sheet while keeping the long fibers of the reinforcing layer intact and without melting the reinforcing layer. The laminated sheet and reinforcing layer was then allowed to cool at room temperature and was cut into 102 mm wide strips to form a composite laminate which can be used to heat seal, splice or fuse the cured polyolefin, e.g. EPDM rubber roofing membrane in accordance with the present invention.

When forming roofing bonds, it is highly desirable to form a seal which meets the industry standard T-Peel test values. Other criteria used in determining whether an acceptable bond is formed is a Cold Flex test, a Static Shear test and most preferably the ability to form rubber tearing bonds. It was surprisingly discovered that seals formed employing heat sealable polyolefin with or without a reinforcing layer according to the present invention exceeded the industry standards in all of the above tests, and advantageously formed rubber tearing bonds in all cases. The T-Peel test is described below:

T-Peel Test. It is necessary that a bond formed according to manufacturers' directions in a roofing membrane receive a minimum initial T-Peel value of at least 0.54 Kg/cm and an "aged value" of at least about 0.2 Kg/cm. The standard T-Peel test is described in ASTM D-1876 (October, 1972).

The standard test is modified by requiring a 5 cm/min constant head speed on the tension testing machine. In this test, two 2.54 cm wide × 15 cm long × 1 mm thick strips of commercially available EPDM-based membrane, each provided with a 38 micrometer layer of heat sealable polyolefin, are placed end-to-end and are overlapped by approximately 5 cm at one end and are laminated for one minute in a press at 160° C. and at a pressure of 20 kPa. The sample is allowed to age for 7 days at room temperature (about 23° C). Conventional peel tests are then performed in tensile testing equipment in which the jaws are separated at a rate of 5 cm/min. In roofing applications, initial values should be at least 0.54 Kg/cm when tested at room temperature. When subjected to any one of the conditions described below and then re-tested, the T-peel test values should be at least the minimum values aforementioned. In all cases, the T-Peel values of seals formed according to the present invention exceeded the minimum values, and even more surprisingly did not decrease in strength when subjected to any of the below enumerated "aging" tests.

a. Weathering Cycle. Lap seam samples are prepared by cutting two rubber sheets, each measuring 15 cm by 30 cm to make a 30 cm long splice with a 12 cm lap. The sheets are thoroughly cleaned with hexane and are allowed to dry. The heat sealable polyolefin is applied to both the contact area of the first sheet and the contact area of the second sheet according to the present invention (measuring 30.5 cm by 12.7 cm) forming a test sheet. The test sheet is allowed to age at room temperature for 7 days and 50% relative humidity (RH) before testing. The test sheet is then cut along the 15 cm length into 2.54 cm wide strips.

After seven days of aging, 5 pieces are peel tested at room temperature. Five pieces are subjected to a weathering cycle including four repetitions of four phases for a total of 28 days. Phase one includes placing the strip in a circulating air oven set at 80° C. for 24 hrs. Phase two includes immersing the same strip in water at 80° C. for 72 hrs. Phase three includes placing the same strip in a freezer at −18° C. for 8 hrs. Phase four includes immersing the same strip in water at 80° C. for 64 hrs. The four phases are then repeated in the same order three more times to complete the weathering cycle test. Temperature tolerances in the oven and freezer are ±2° C. Time tolerances for the weathering cycles are ±0.5 hrs. Five samples which are aged but not subjected to the weathering cycle are tested according to ASTM D-1876 (October, 1972) but modified by using a 5 cm/min constant head speed and the results are averaged to determine an "initial value." The other five samples are subjected to the Weathering Cycle and tested according to the same T-Peel test procedure. The weathered sample test values are averaged to provide an "aged value." The samples are allowed to equilibrate for 16–32 hrs at room temperature prior to testing.

Other samples may be made and tested according to the above procedure and tested to evaluate bonds. The T-Peel criteria listed above also applies to the tests listed below.

b. High Humidity. T-peel samples are exposed to 38° C. and 100% RH for one week, are removed, dried and tested at room temperature.

c. Heat Aging. Samples are placed in a 70° C. oven for one week, removed and tested at room temperature.

d. Heat Resistance. T-peel samples are heated as in sub-paragraph "e" but are tested at 70° C.

e. Weather Resistance. Samples are exposed to the artificial weathering conditions provided by a "Weatherometer" machine in accordance to ASTM Test D-750 (June, 1985). Tests are performed after 250 and 500 hrs.

f. Freeze-Thaw Resistance. T-peel samples are immersed in room temperature water for one week and are then placed in a −18° C. freezer for one week. They are removed and tested at room temperature.

In tests b-f, the formed seal was water impermeable and the formed bond was a rubber tear bond, i.e., its strength was greater than tear strength of rubber.

It was surprisingly discovered that each seal formed according to the present invention had a T-peel strength of at least 1.2 Kg/cm. Even more surprising, it was discovered that the samples subjected to tests a–f did not have lower aged values than initial values.

Other tests used to evaluate the quality of the seal include a Cold Flex test and a Static Shear test.

Static shear Test. Strips of rubber sheeting 2.54 cm wide × 15.2 cm long are overlapped 2.54 cm at an end and bonded together. The strip is then hung vertically in a 70° C. oven with a 300 g weight attached to the free end. Failure should not occur in less than 24 hrs.

Cold Flex Test Spliced EPDM composite is conditioned at −30° C. for 24 hrs and then wrapped around a 6.4 mm mandrel. No cracking should occur when flexed. Each of the polyolefin adhesives tested yielded suitable Static Shear and Cold Flex results provided that the surfaces to be joined were at least at a temperature of 150° C. prior to contacting with the softened film. Each of the water impermeable seals formed according to the present invention when tested yielded acceptable results.

The Figures show numerous ways to practice the present invention. FIG. 1 shows that a substantially water impermeable seal may be formed between a relatively thick film 10 of LLDPE and a sheet 12 of EPDM rubber. A bond is formed according to the present invention between a film 10 approximately 1.5 mm thick and sheet of cured polyolefin 12, the sheet having an upper surface 16 including a contact area 14. Such an arrangement might be useful to cover damaged areas of an already installed membrane.

Figure 2:
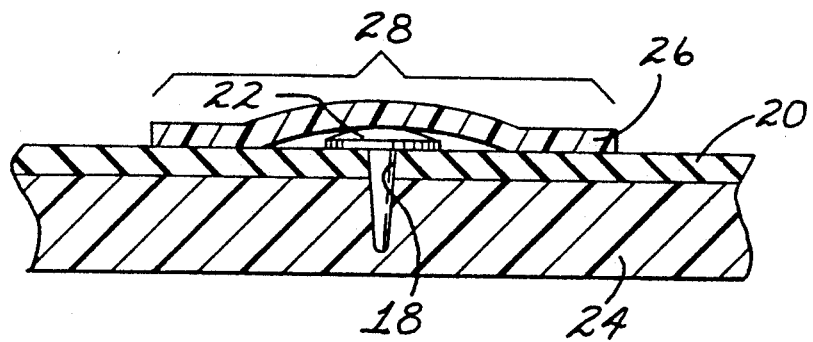
FIG. 2 is a cross sectional view illustrating a substantially water impermeable seal formed according to the present invention between a surface of a sheet of heat sealable polyolefin and a contact area of a sheet of cured polyolefin, the sheet being punctured in the contact area by an anchoring device.

FIG. 2 shows the use of the present invention in sealing openings 18 in the cured polyolefin layer 20 due to applying mechanical fasteners 22 through the cured polyolefin layer 20 and into the substrate 24. A relatively thick heat sealable polyolefin film 26 of a size sufficient to completely surround each fastener 22 is applied over the head of the fastener and contacts the contact area 28 according to the present method, forming a substantially water impermeable seal around the openings 18. The polyolefin film 26 may advantageously be applied in the form of a strip to seal a plurality of openings.

Figure 3:
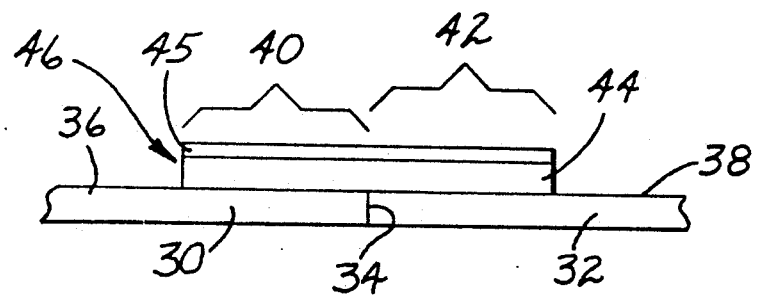
FIG. 3 is a schematic drawing illustrating a substantially water impermeable seal formed according to the present invention between a surface of a sheet of heat sealable polyolefin and contact areas of two sheets of cured polyolefin having adjacent edges in butting relationship.

The present invention may advantageously be used to form a substantially water impermeable seal over a butt joint. FIG. 3 shows two sheets of cured polyolefin 30 and 32, each having an edge which is butted together forming a butt joint 34. Although FIG. 3 shows a butt joint in which there is no space between the edges, the present invention may also be used when the edges are spaced apart. To form a substantially water impermeable seal, a portion of each of the upper surfaces 36 and 38 defining contact areas 40 and 42 proximate the butt joint 34 are contacted with sheet 44 of capping laminate 46. Sheet 44 is formed of a heat sealable polyolefin according to the invention. The preferred sheet 44 has a thickness of about 1.5 mm and is thick enough to protect the butt joint as well as providing enough heat sealable polyolefin to form a substantially water impermeable seal. Heat sealable polyolefin sheet 44 is preferably formed of LLDPE.

Sheet 44 is preferably compounded with UV light absorbers as described in Example 4 when laminate 46 or sheet 44 is exposed to outdoor conditions such as in a roofing application. Such additive need not be included when sheet 44 or laminate 46 is intended to be used for lining a water reservoir where no UV light is present.

A heat resistant porous backing 45 which functions as a reinforcing layer may be bonded to the heat sealable polyolefin 44, e.g., low density polyethylene to form a sealing tape or laminate 46 by pressing it into contact with the polyethylene sheet 44 while hot, that is, just as the sheet 44 exits the extruder. Reinforcing layer 45 is preferably formed of a sheet of heat resistant fibrous material such as woven or non-woven fiberglass, spunbound polyester fiber, cellulose fiber, cotton and nylon fiber. A suitable nylon fiber for the reinforcing layer is available under the trade designation "CEREX" 4803-23 from James River Corp. A suitable spunbound polyester is available under the trade designation "Reemay" Style 2250 from Reemay, Inc. As heat is applied by any of the methods above described, the heat sealable polyolefin sheet 44 becomes molten and fuses to the two sheets of cured polyolefin rubber membranes 30 and 32 forming a tight seal along butt joint 34.

Reinforcing layer 45 desirably has an openness or porosity such that it will allow molten heat sealable polyolefin 44, e.g., molten low density polyethylene to seep into and through the layer 45 thickness. This provides a strong bond between reinforcing layer 45 and the heat sealable polyolefin 44. Reinforcing layer 45 holds the heat sealable polyolefin 44, e.g., low density polyethylene, in place as it becomes molten and thus provides integrity to laminate 46 during subsequent heating. Reinforcing layer 45 also reduces the chance of the polyolefin sheet 44 splitting if too much heat is accidentally concentrated on the surface of sheet 44. Another advantage of the porous reinforcing layer 45 is that if one heat sealable laminate 46 is crossed over another like laminate, the molten low density polyethylene from the top laminate 46 will be able to flow through the reinforcing layer of the underlying like laminate and thus fuse with the low density polyethylene of the underlying laminate. This type of crossing is desirable in roofing application in order to conveniently splice intersecting seams of the cured polyolefin rubber membranes 30 and 32.

The fiber density of reinforcing layer 45 should be such to as to create an openness or porosity of at least 20% of the reinforcing layer's exposed planar surface area. That is, upon viewing the planar top or bottom surface of reinforcing layer 45, the open area between fibers should amount to at least 20% of the planar surface area. The percent openness or porosity of reinforcing layer 45 by volume should amount to at least 1% of the total reinforcing layer volume.

Reinforcing layer 45 preferably has a thickness between about 0.025 to 0.5 mm and more preferably between 0.075 to 0.125 mm. Reinforcing layer 45 is preferably of relatively light weight having a basis weight of at least about 6.8 g/m² and preferably between about 6.8 and 850 g/m² for any given thickness between 0.025 to 0.5 mm. Reinforcing layer 45 advantageously has a melting point at least about 4° C. higher and preferably at least about 38° C. higher than the temperature required to fusing the low density polyethylene 44 to the cured polyolefin rubber roofing membranes 30 and 32. The temperature at which the low density polyethylene sheet 44 is fused to the cured polyolefin membrane 30 and 32 is typically between about 160° C. and 232° C. Reinforcing layer 45 desirably has a tensile strength of 0.35 Kg/cm width in the machine direction (i.e. longitudinal direction). The reinforcing layer having the above mentioned properties reinforces the linear low density polyethylene 44 and gives it structural integrity and support when the polyethylene 44 is heated to a molten state.

Figure 12:
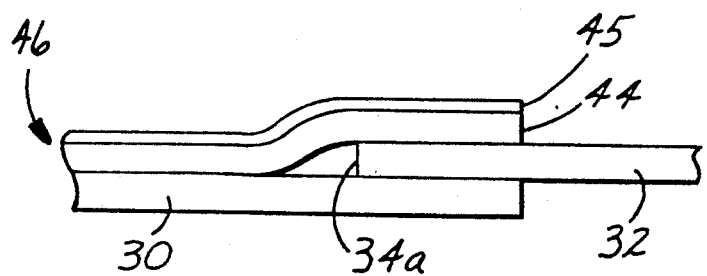
FIG. 12 is a schematic drawing illustrating a substantially water impermeable seal formed between a surface of a heat sealable polyolefin sheet and two overlapping sheets of cured polyolefin.

Although preferred, it is not necessary that the cured polyolefin sheets be in a juxtaposed, that is, in a side by side arrangement as in FIG. 3. The cured polyolefin sheets 30 and 32 can be overlapping as shown in FIG. 12. In that embodiment the heat sealable polyolefin 44 is placed over the seam 34a formed by the overlapping cured polyolefin sheets 30 and 32 so that a portion of heat sealable polyolefin sheet 44 contacts a portion of the surface of cured polyolefin sheets 30 and 32 on either side of seam 34a. The heat sealable polyolefin sheet 44 is bonded to reinforcing layer 45 to form capping laminate 46. The composition and thicknesses of the heat sealable polyolefin sheet 44 and reinforcing layer 45 as shown in FIG. 12 are the same as described with reference to the embodiment shown in FIG. 3. If the heat sealable polyolefin sheet 44 of FIG. 12 is formed of low density polyethylene, sheet 44 is preferably fused to the cured polyolefin membranes 30 and 32 at a contact temperature typically between about 160° C. and 232° C.

Figure 4:
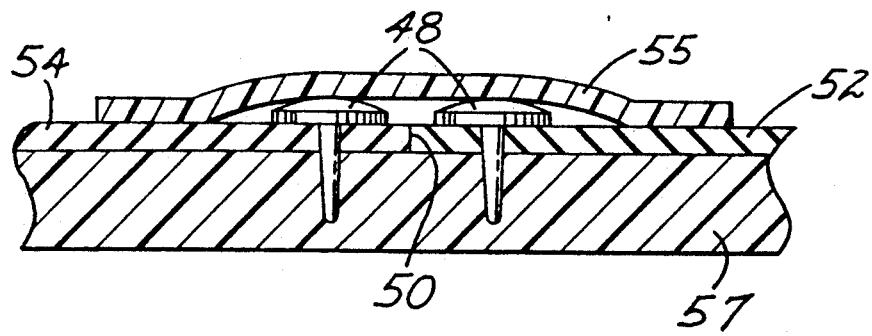
FIG. 4 is a cross sectional view illustrating a substantially water impermeable seal formed according to the present invention between a surface of a sheet of heat sealable polyolefin and contact areas of two sheets of cured polyolefin having adjacent edges in butting relationship, each cured polyolefin sheet being punctured in the contact area by an anchoring device.

FIG. 4 is a variation of FIG. 2 where two rows of mechanical fasteners 48 are provided, one row on each side of the butt joint 50 located between two adjacent sheets 52 and 54 of cured polyolefin. A strip of heat sealable polyolefin 55 covering the butt joint 50 as well as each of the fasteners 48 may be sealed to a contact surface of each sheet 52 and 54 according to the present invention.

Figure 5:
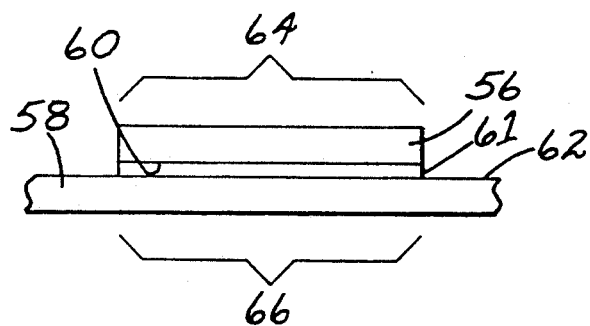
FIG. 5 is a schematic drawing illustrating a first substantially water impermeable seal formed according to the present invention between two sheets of cured polyolefin positioned substantially face to face, a heat sealable polyolefin defining the adhesive layer between the two cured polyolefin sheets.

FIG. 5 is another variation of the present invention. Two sheets of cured polyolefin 56 and 58 are provided. According to the most preferred method, a film of heat sealable polyolefin 61 having a thickness of at least 0.06 mm is placed between the sheets. The first sheet 56 has a lower surface 60 and the second sheet 58 has an upper surface 62. At least a portion of surfaces 60 and 62 are defined as contact areas 64 and 66 for receiving the heat sealable polyolefin 61. According to the present invention, a film having a thickness of at least 0.06 mm is sufficient to adequately wet both contact areas 64 and 66 to form a substantially water impermeable bond between the two sheets 56 and 58.

Figure 6:
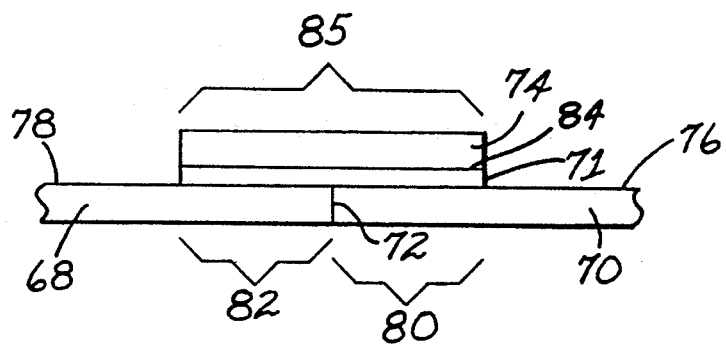
FIG. 6 is a schematic drawing illustrating a substantially water impermeable seal formed according to the present invention between a contact area of two cured polyolefin sheets, each sheet having an edge, the edges being butted together, and a contact area of a capping strip formed from a sheet of cured polyolefin.

The present invention may be used to form a capped butt joint between two sheets of cured polyolefin, and a capping strip of cured polyolefin. FIG. 6 shows such a structure. Two cured polyolefin sheets 68 and 70 each have adjacent edges which are positioned to form a butt joint 72. In order to seal the butt joint, a third sheet of polyolefin defining a capping strip 74 is positioned above and straddling the butt joint 72. A portion of the upper surfaces 76 and 78 of sheets 70 and 68 defines contact areas 80 and 82. The contact areas 80 and 82 extend along the entire length of the butt joint 72 in a preferred embodiment. The lower surface 84 of the capping strip 74 defines a contact area 85. A sheet of heat sealable polyolefin film 71 is place between contact areas 80, 82 and 85, and a seal according to the present method is formed. The butt joint is protected with a capping strip 74 of cured polyolefin having the same strength and weathering characteristics of the sheets 68 and 70 used to form the roofing membrane.

Figure 7:
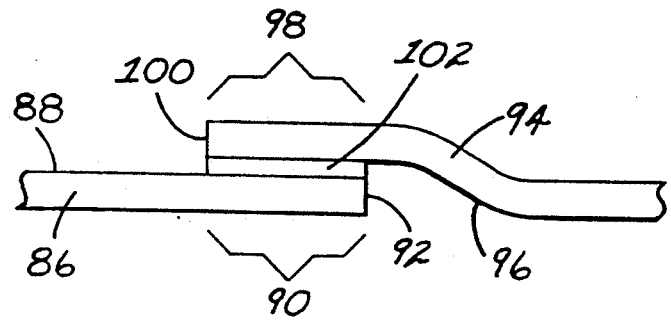
FIG. 7 is a schematic drawing illustrating a substantially water impermeable seal defining a lap joint formed according to the present invention between contact areas of two overlapping sheets of cured polyolefin.

FIG. 7 is a schematic drawing of a lap joint formed according to the present invention. A first cured polyolefin sheet 86 is provided with an upper surface 88 including a contact area 90 located proximate the edge 92 of the sheet 86. The contact area extends approximately the entire length of the sheet. A second cured polyolefin sheet 94 is provided having a lower surface 96. A portion of the lower surface 96 defines a contact area 98. Contact area 98 is located proximate the edge 100 of sheet 94 along the length of the sheet. A strip of heat sealable polyolefin film 102 is positioned between contact surfaces 90 and 98 and a seal is formed according to the present method.

Figure 8:
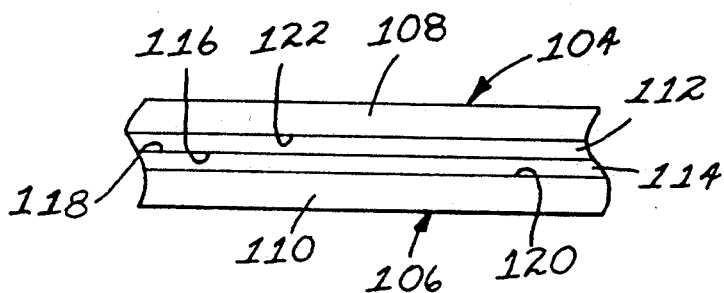
FIG. 8 is a schematic drawing illustrating a substantially water impermeable seal formed according to the present invention between two composite sheets each having a cured polyolefin layer and a heat sealable polyolefin layer.

FIG. 8 is a schematic drawing of two sheets of cured polyolefin and heat sealable polyolefin formed according to the present invention, and then later sealed. Two composite sheets 104 and 106 are formed according to the present invention, each sheet having a cured polyolefin layer 108, 110 and a heat sealable layer 112 and 114. The heat sealable layers 112 and 114 each have heat sealable contacting surface 116 and 118 respectively which are heated and sealed according to the present invention to form a substantially water impermeable seal. It is to be understood that each of the heat sealable layers 112 and 114 although shown as two layers for purposes of illustration after heating and contacting form one substantially homogeneous layer. Such a method is preferable when the contact areas 122 and 120 of the sheets 104 and 106 respectively are rough. This provides more heat sealable polyolefin available for bonding to the cured polyolefin sheet.

Figure 9:
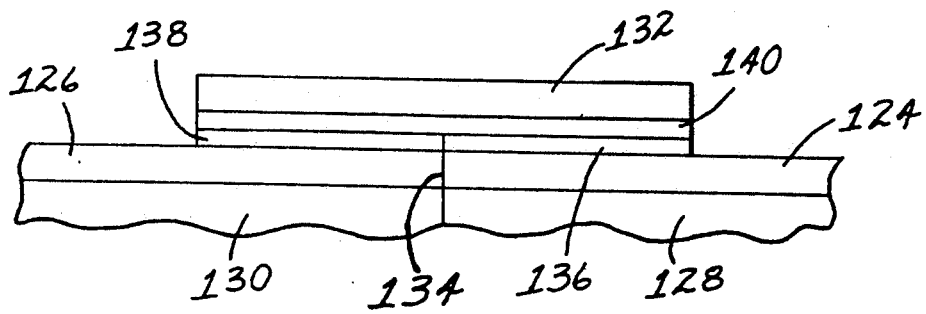
FIG. 9 is a schematic drawing illustrating a substantially water impermeable seal formed according to the present invention between two composite sheets formed according to the present invention, each sheet having a heat activatable surface, and a third composite sheet having a heat activatable surface.

The present invention can be advantageously used to form substantially water impermeable seals in roofing membranes which must be butt welded. For example, FIG. 9 shows two sheets of cured polyolefin roofing membrane 124, 126, each having a flocked backing 128 and 130. The flock backed membranes 124 and 126 cannot be joined by lapping because the flocking would prevent forming a substantially water impermeable seal. A capping strip 132 is applied over a butt joint 134 formed by the edges of membranes 124 and 126. The heat sealable layers 136, 138 and 140 may be preapplied to the respective membranes 124, 126 and 132 respectively and then joined together according to the present invention, or membranes 124, 126 and 132 may be joined in one step.

Figure 10:
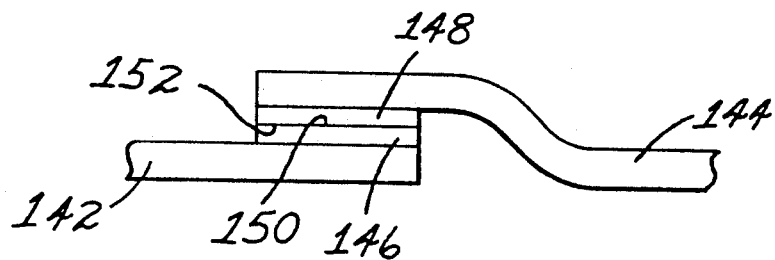
FIG. 10 is a schematic drawing illustrating a substantially water impermeable lap joint seal formed by the present invention between two composite sheets formed according to the present invention, each having a heat activatable surface.

FIG. 10 is a lap joint formed according to the present invention by first forming two composite membranes 142 and 144, each membrane having a heat sealable layer 146 and 148 and a heat sealable surface 150 and 152. The heat sealable surfaces 150 and 152 may then be joined according to the present invention.

If the capping strip is to be formed from heat sealable polyolefin, then it is desirable to compound the olefin with a sufficient amount of carbon black and UV light absorber, and antioxidants as above mentioned to improve weather resistance such as resistance to UV degradation. Further, the presence of the carbon black improves the absorbance of radiation heat by the heat sealable polyolefin.

Figure 11:
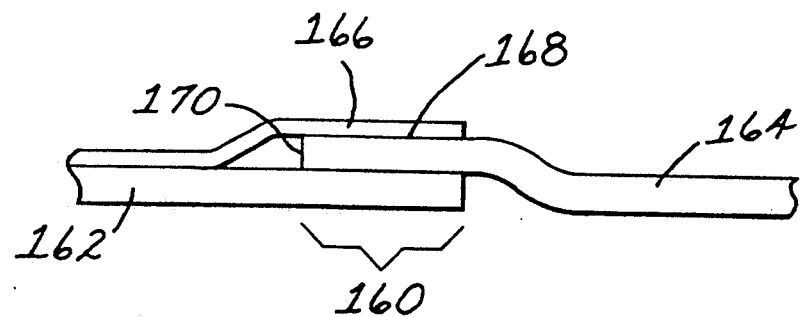
FIG. 11 is a schematic drawing illustrating a substantially water impermeable lap joint seal formed by the present invention with a sheet of heat sealable polyolefin covering the lap joint.

FIG. 11 is a schematic drawing of a lap joint 160 formed according to the present invention by positioning a portion of a cured polyolefin sheet 164 over a portion of cured polyolefin sheet 162. A heat sealable polyolefin sheet 166 is positioned over a top surface portion 168 of the sheet 164 that is positioned atop the sheet 162. The heat sealable polyolefin sheet 166 covers the top surface 168 and an edge 170 of the sheet 164 that is disposed over the sheet 162, and a seal is formed according to the present invention.

Although the present invention has been described with reference to preferred embodiments, workers skilled in the art will recognize that changes may be made in form and detail without departing from the spirit and scope of the invention.

We claim:

1. A laminate comprising two cured polyolefin sheets and a carbon black containing heat sealable polyolefin sheet wherein the cured polyolefin sheets have a seam therebetween and the heat sealable polyolefin sheet covers said seam and is fused to each of said cured polyolefin sheets to produce a substantially water impermeable seal between said cured sheets, said heat sealable polyolefin sheet having a first major surface and opposite second major surface, said first major surface bonded to a porous backing and the second major surface being fused to said cured polyolefin sheets, the presence of carbon black in said heat sealable polyolefin sheet improves its weatherability and the absorbance of radiation heat by said heat sealable polyolefin sheet.

2. The laminate of claim 1 wherein the two cured polyolefin sheets are in juxtaposed relationship to each other.

3. The laminate of claim 1 wherein the two cured polyolefin sheets overlap each other.

4. The laminate of claim 1 wherein the porous backing comprises fibrous material.

5. The laminate of claim 1 wherein the cured polyolefin sheets are roofing membranes.

6. The laminate of claim 1 wherein the cured polyolefin sheets comprise rubber formed of ethylene, propylene and diene monomers (EPDM).

7. The laminate of claim 1 wherein the cured polyolefin sheets comprise rubber formed of ethylene and propylene monomers (EPM).

8. The laminate of claim 1 wherein the heat sealable polyolefin is selected from the group consisting of low density polyethylene, linear low density polyethylene, ethylene vinyl acetate, polypropylene and a blend of low density polyethylene and polypropylene.

9. The laminate of claim 1 wherein the heat sealable polyolefin comprises linear low density polyethylene.

10. The laminate of claim 1 wherein said backing comprises a fibrous material selected from the group consisting of fiberglass, polyester, cellulose, cotton and nylon fiber.

11. The laminate of claim 1 wherein said backing has a thickness between about 0.025 and 0.5 mm.

12. The laminate of claim 1 wherein the heat sealable polyolefin is in the form of a film having a thickness of at least about 0.06 mm.

13. The laminate of claim 9 wherein said laminate is formed by heating the cured polyolefin to a temperature between about 160° C. and 232° C. so that the polyethylene becomes molten and fuses to said cured polyolefin sheets, and wherein said backing has a melting point higher than the temperature to which said cured polyolefin is heated.

14. The laminate of claim 13 wherein a contacting pressure between about 7 and about 138 kPa is applied between the cured polyolefin sheet and the heat sealable sheet during said heating.

15. The laminate of claim 13 wherein the backing has a void volume of at least about 1% of the total backing volume and wherein a portion of the polyethylene penetrates the backing void volume during said heating.

16. A flexible laminate comprising a carbon black containing heat sealable polyolefin layer bonded to a porous backing and fused to two cured polyolefin sheet to produce a substantially water impermeable seal at the seam between said two cured polyolefin sheet wherein said porous backing has a melting temperature higher than the melting temperature of the heat sealable polyolefin layer, the presence of carbon black in said heat sealable polyolefin sheet improves its weatherability and the absorbance of radiation heat by said heat sealable polyolefin sheet.

17. The flexible laminate of claim 16 wherein the heat sealable polyolefin layer comprises low density polyethylene.

18. The flexible laminate of claim 16 wherein the porous backing comprises fibrous material selected from the group consisting of fiberglass, polyester, cellulose, cotton and nylon fiber.

19. The flexible laminate of claim 16 wherein the backing has a thickness between about 0.025 mm and 0.5 mm and the heat sealable polyolefin layer has a thickness of at least about 0.06 mm.

20. The flexible laminate of claim 16 wherein the backing has a porosity of at least 1% by volume.

21. A composite structure comprising:
(a) two cured polyolefin sheets in proximity to each other having a seam there between; and
(b) a sealing tape comprising a porous backing having a layer of heat sealable polyolefin bonded thereto, wherein said sealing tape covers said seam and is fused to each of said polyolefin sheets through said heat sealable polyolefin layer to produce a substantially water impermeable seal between said cured sheets and further wherein said heat sealable polyolefin comprises carbon black, the presence of carbon black in said heat sealable polyolefin sheet improves its weatherability and the absorbance of radiation heat by said heat sealable polyolefin sheet.

22. A flexible roofing membrane comprising first and second cured, flexible polyolefin sheets having a seam therebetween, a sealing tape over said seam and fused to each of said sheets to produce a substantially water impermeable seal between said cured sheets, wherein said tape comprises a porous backing having a layer of carbon black containing heat sealable polyolefin therein, which heat sealable polyolefin contacts said cured sheets and is fused thereto, the presence of carbon black in said heat sealable polyolefin sheet improves its weatherability and the absorbance of radiation heat by said heat sealable polyolefin sheet.

23. A laminate according to claim 1 wherein said heat sealable polyolefin sheet consists essentially of a polyolefin.

24. A laminate according to claim 23 wherein said polyolefin is selected from the group consisting of low density polyethylene, linear low density polyethylene, ethylene vinyl acetate, polypropylene and a blend of low density polyethylene and polypropylene.

25. A flexible laminate according to claim 16 wherein said heat sealable polyolefin sheet consists essentially of a polyolefin.

26. A flexible laminate according to claim 25 wherein said polyolefin is selected from the group consisting of low density polyethylene, linear low density polyethylene, ethylene vinyl acetate, polypropylene and a blend of low density polyethylene and polypropylene.

* * * * *